United States Patent
Kfir et al.

(10) Patent No.: US 10,924,374 B2
(45) Date of Patent: Feb. 16, 2021

(54) TELEMETRY EVENT AGGREGATION

(71) Applicant: Mellanox Technologies TLV Ltd., Raanana (IL)

(72) Inventors: Aviv Kfir, Nili (IL); Barak Gafni, Campbell, CA (US); Zachy Haramaty, Hemed (IL); Gil Levy, Hod Hasharon (IL); Liron Mula, Ramat Gan (IL); Jacob Ruthstein, Mazor (IL); Michael Taher, Yavne (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 33 days.

(21) Appl. No.: 16/515,060

(22) Filed: Jul. 18, 2019

(65) Prior Publication Data
US 2021/0021503 A1    Jan. 21, 2021

(51) Int. Cl.
*G06F 15/16*    (2006.01)
*H04L 12/26*    (2006.01)

(52) U.S. Cl.
CPC ........ *H04L 43/0876* (2013.01); *H04L 43/065* (2013.01); *H04L 43/067* (2013.01); *H04L 43/16* (2013.01)

(58) Field of Classification Search
CPC . H04L 43/0876; H04L 43/065; H04L 43/067; H04L 43/16
USPC ........................................................ 709/224
See application file for complete search history.

(56) References Cited

U.S. PATENT DOCUMENTS

| | | | |
|---|---|---|---|
| 6,751,663 B1 | 6/2004 | Farrell et al. | |
| 8,606,911 B2* | 12/2013 | Raleigh | H04L 12/14 709/224 |
| 8,879,393 B2* | 11/2014 | Voruganti | H04L 47/30 370/235 |
| 9,755,932 B1* | 9/2017 | Godbole | H04L 43/0876 |
| 10,181,987 B2 | 1/2019 | Gandham et al. | |
| 10,798,254 B2* | 10/2020 | Raleigh | H04M 15/70 |

(Continued)

OTHER PUBLICATIONS

MELLANOX/MLXSW—"Link Layer Discovery Protocol", pp. 1-2, Jul. 7, 2016 https://github.com/Mellanox/mlxsw/wiki/Link-Layer-Discovery-Protocol.

(Continued)

*Primary Examiner* — Moustafa M Meky
(74) *Attorney, Agent, or Firm* — Kligler & Associates Patent Attorneys Ltd

(57) ABSTRACT

In one embodiment a network device includes multiple interfaces including at least one egress interface, which is configured to transmit packets belonging to multiple flows to a packet data network, control circuitry configured to generate event-reporting data-items, each including flow and event-type information about a packet-related event occurring in the network device, a memory, and aggregation circuitry configured to aggregate data of at least some of the event-reporting data-items into aggregated-event-reporting data-items aggregated according to the flow and event-type information of the at least some event-reporting data-items, store the aggregated-event-reporting data-items in the memory, and forward one aggregated-event-reporting data-item of the aggregated-event-reporting data-items to a collector node, and purge the one aggregated-event-reporting data-item from the memory.

27 Claims, 11 Drawing Sheets

(56) References Cited

U.S. PATENT DOCUMENTS

| | | | |
|---|---|---|---|
| 2002/0184568 A1 | 12/2002 | Kurrasch | |
| 2010/0020722 A1 | 1/2010 | Farkas et al. | |
| 2011/0261720 A1 | 10/2011 | Diab et al. | |
| 2012/0243412 A1* | 9/2012 | Voruganti | H04L 47/30 370/235 |
| 2013/0275566 A1 | 10/2013 | Huth et al. | |
| 2014/0133358 A1 | 5/2014 | Yin et al. | |
| 2014/0321460 A1 | 10/2014 | Kaneko et al. | |
| 2015/0156072 A1 | 6/2015 | Kirrmann | |
| 2016/0127197 A1 | 5/2016 | Yethadka et al. | |
| 2019/0132736 A1* | 5/2019 | Raleigh | H04L 63/20 |
| 2019/0207832 A1 | 7/2019 | Dor | |
| 2020/0036603 A1 | 1/2020 | Nieves et al. | |
| 2020/0059426 A1* | 2/2020 | Raleigh | H04L 43/0888 |
| 2020/0065524 A1 | 2/2020 | Carlson | |

OTHER PUBLICATIONS 802.1AB—IEEE Standard for "Local and Metropolitan Area Networks; Station and Media Access Control Connectivity Discovery", pp. 1-172, May 6, 2005.

Tammana et al., "Distributed Network Monitoring and Debugging with SwitchPointer," Proceedings of the 15th Usenix Symposium on Networked Systems Design and Implementation (Nsdi '18), pp. 452-466, Renton, Usa, Apr. 9-11, 2018.

U.S. Appl. No. 16/792,247 Office Action dated Nov 24, 2020.

\* cited by examiner

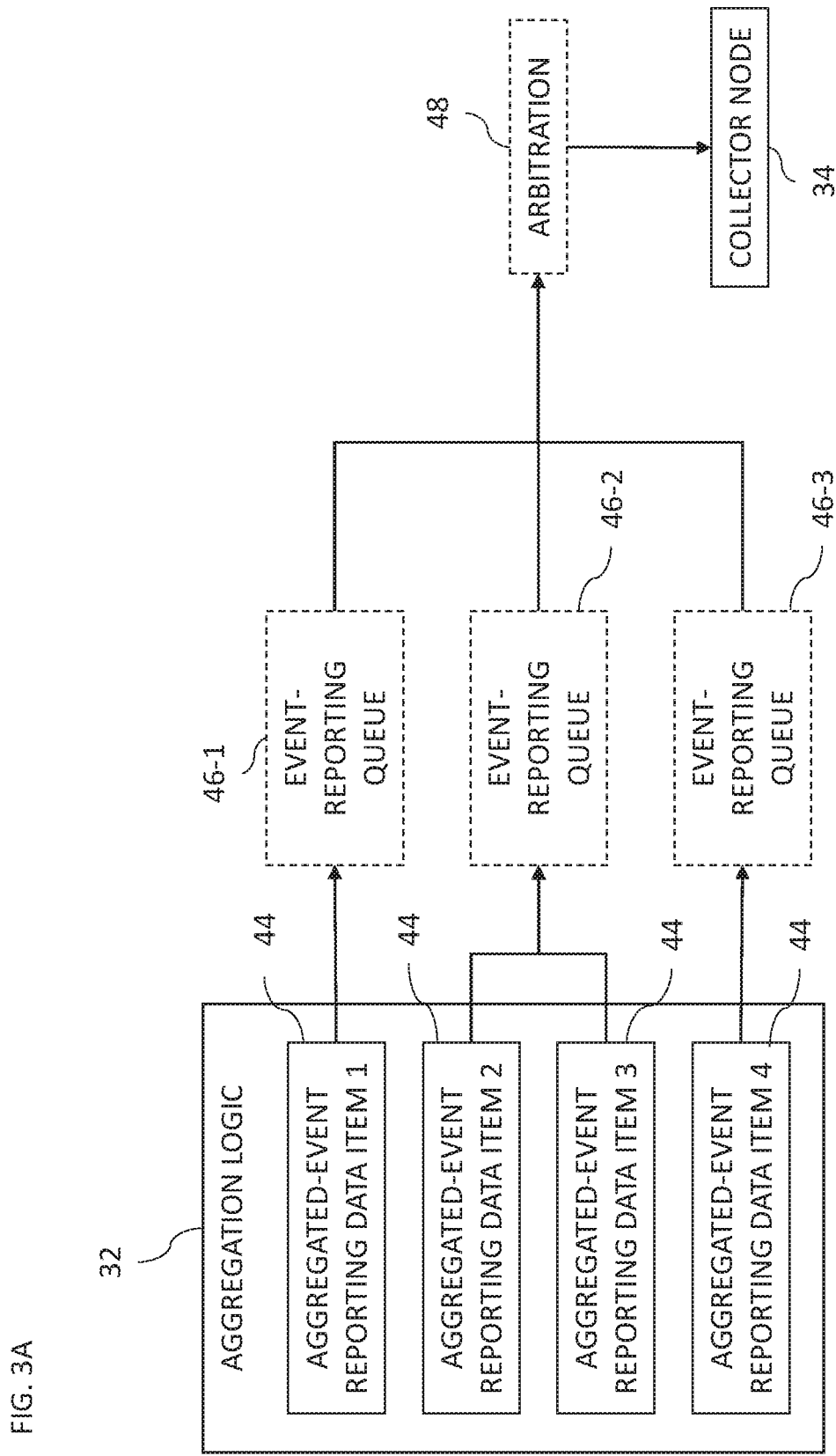

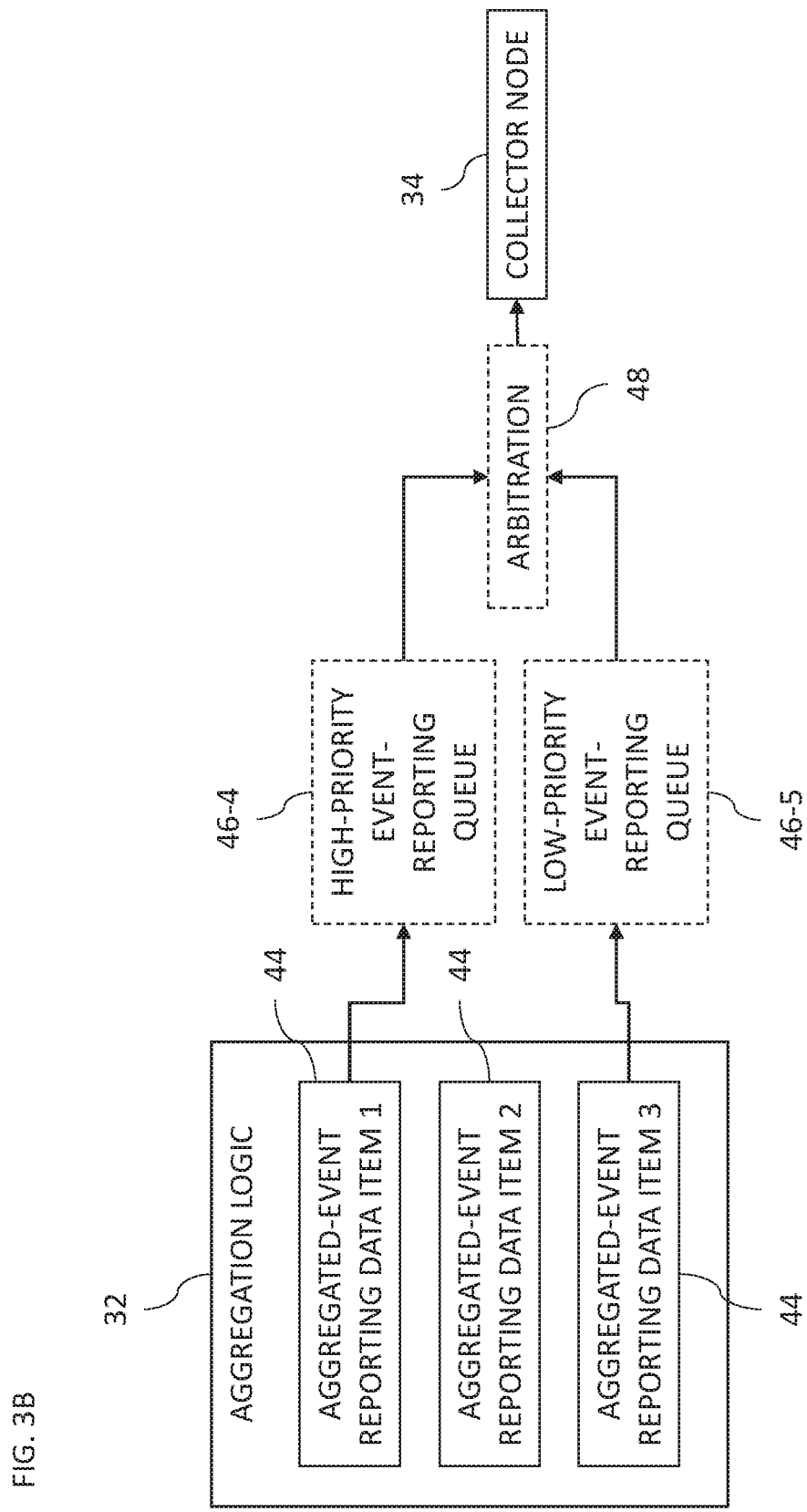

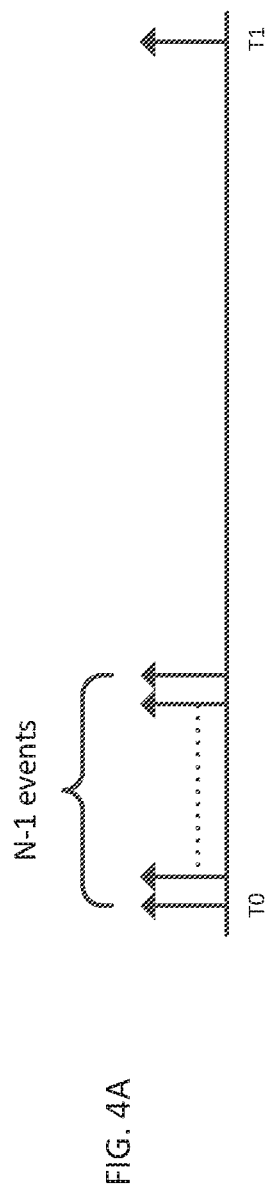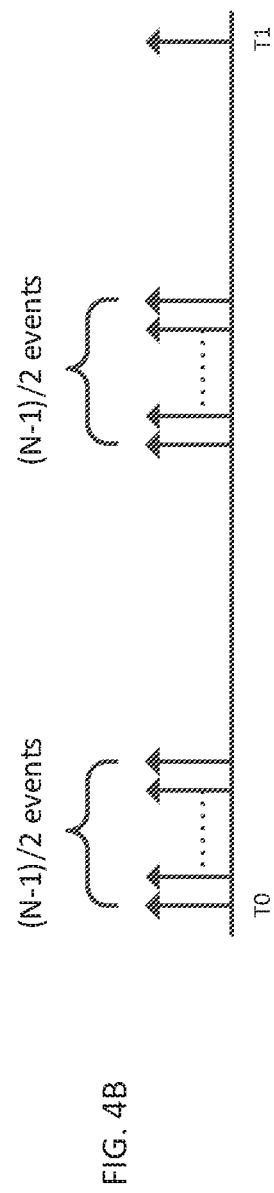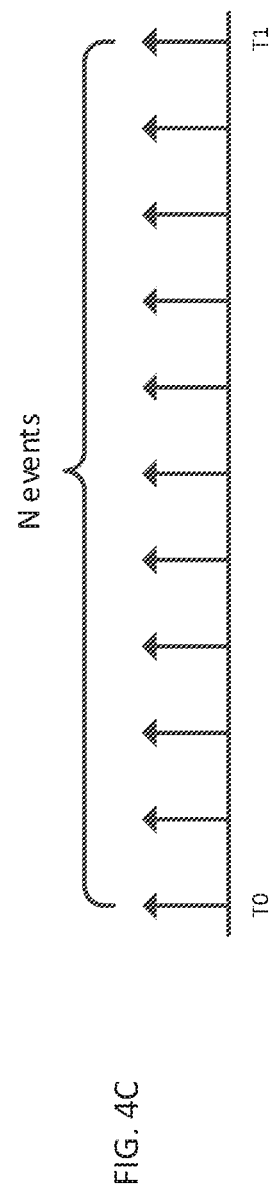

TELEMETRY EVENT AGGREGATION

FIELD OF THE INVENTION

The present invention relates to network devices, and in particular, but not exclusively to, processing telemetry information in network devices.

BACKGROUND

Telemetry in networking provides the ability to monitor and retrieve information from a network, for example, from one or more given network devices. The telemetry information that may be retrieved from a network device like a switch, router, or network interface card (NIC) may vary and depend, for example, on the type of the network device and the vendor. There are several categories of telemetry information, such as status-based and event-driven telemetry information.

Collecting telemetry information is described in several publications. For example, U.S. Pat. No. 6,751,663 to Farrell, et al., describes a system for collecting and aggregating data from network entities for a data consuming application is described. The system includes a data collector layer to receive network flow information from the network entities and to produce records based on the information. The system also includes a flow aggregation layer fed from the data collection layer and coupled to a storage device. The flow aggregation layer receiving records produced by the data collector layer and aggregates received records. The system can also include an equipment interface layer coupled to the data collector layer and a distribution layer to obtain selected information stored in the storage device and to distribute the select information to a requesting, data consuming application.

By way of another example, U.S. Pat. No. 10,181,987 to Grandham, et al., describes systems, methods, and computer-readable media for collector high availability. In some embodiments, a system receives, from a first collector device, a first data report generated by a capturing agent deployed on a host system in a network. The system can also receive, from a second collector device, a second data report generated by the capturing agent deployed on the host system. The first and second data reports can include traffic data captured at the host system by the capturing agent during a period of time. The system can determine that the first data report and the second data report are both associated with the capturing agent, and identify duplicate data contained in the first data report and the second data report. The system can then deduplicate the first and second data reports to yield a deduplicated data report.

SUMMARY

There is provided in accordance with an embodiment of the present disclosure a network device, including multiple interfaces including at least one egress interface, which is configured to transmit packets belonging to multiple flows to a packet data network, control circuitry configured to generate event-reporting data-items, each including flow and event-type information about a packet-related event occurring in the network device, a memory, and aggregation circuitry configured to aggregate data of at least some of the event-reporting data-items into aggregated-event-reporting data-items aggregated the flow and event-type information of the at least some event-reporting data-items, store the aggregated-event-reporting data-items in the memory, and forward one aggregated-event-reporting data-item of the aggregated-event-reporting data-items to a collector node, and purge the one aggregated-event-reporting data-item from the memory.

Further in accordance with an embodiment of the present disclosure the aggregation circuitry is configured to forward the one aggregated-event-reporting data-item to the collector node, and purge the one aggregated-event-reporting data-item from the memory, responsively to the memory reaching a threshold for storage of the aggregated-event-reporting data-items.

Still further in accordance with an embodiment of the present disclosure the aggregation circuitry is configured to assign the one aggregated-event-reporting data-item to an event-reporting queue queuing at least one of the aggregated-event reporting data-items waiting to be forwarded to the collector node over one of the multiple interfaces.

Additionally, in accordance with an embodiment of the present disclosure the aggregation circuitry is configured to assign the aggregated-event-reporting data-items to different event-reporting queues, each queuing at least one of the aggregated-event reporting data-items waiting to be forwarded to the collector node over one of the multiple interfaces.

Moreover, in accordance with an embodiment of the present disclosure the aggregation circuitry is configured to assign respective ones of the aggregated-event-reporting data-items to different priority event-reporting queues a respective count of events in the respective aggregated-event-reporting data-items.

Further in accordance with an embodiment of the present disclosure respective ones of the aggregated-event-reporting data-items include the flow and event-type information of the respective event-reporting data-items.

Still further in accordance with an embodiment of the present disclosure the aggregation circuitry is configured to compute a respective signature of the flow information of respective ones of the aggregated-event-reporting data-items, wherein respective ones of the aggregated-event-reporting data-items include the respective computed signature and respective event-type information.

Additionally, in accordance with an embodiment of the present disclosure the aggregation circuitry is configured to forward the respective computed signature and the flow information of a respective one of the aggregated-event-reporting data-items to the collector node responsively to the respective signature being computed an initial time from the flow information.

Moreover, in accordance with an embodiment of the present disclosure respective ones of the aggregated-event-reporting data-items include a cumulative event-count and a cumulative byte-count of the respective event-reporting data-items.

Further in accordance with an embodiment of the present disclosure the aggregation circuitry is configured to compute a measure of event burstiness of the events aggregated in each of the aggregated-event-reporting data-items each time the data of another one of the event-reporting data-items is aggregated into a respective one of the aggregated-event-reporting data-items.

Still further in accordance with an embodiment of the present disclosure the aggregation circuitry is configured to compute the measure of event burstiness of the events as a harmonic average.

Additionally, in accordance with an embodiment of the present disclosure the measure of event burstiness of the events for one of the aggregated-event-reporting data-items includes, for each respective one of a plurality of time-difference ranges, a count of adjacent events having a time difference within the respective time-difference range.

Moreover, in accordance with an embodiment of the present disclosure, the device includes an event reporting filter to prevent some of the event-reporting data-items from being input to the aggregation circuitry.

There is also provided in accordance with another embodiment of the present disclosure, an event reporting method, including transmitting packets belonging to multiple flows to a packet data network, generating event-reporting data-items, each including flow and event-type information about a packet-related event occurring in a network device, aggregating, in the network device, data of at least some of the event-reporting data-items into aggregated-event-reporting data-items aggregated the flow and event-type information of the at least some event-reporting data-items, storing the aggregated-event-reporting data-items in a memory, and forwarding one aggregated-event-reporting data-item of the aggregated-event-reporting data-items to a collector node, and purging the one aggregated-event-reporting data-item from the memory.

Further in accordance with an embodiment of the present disclosure the forwarding and the purging is performed responsively to the memory reaching a threshold for storage of the aggregated-event-reporting data-items.

Still further in accordance with an embodiment of the present disclosure, the method includes assigning the one aggregated-event-reporting data-item to an event-reporting queue queuing at least one of the aggregated-event reporting data-items waiting to be forwarded to the collector node.

Additionally, in accordance with an embodiment of the present disclosure, the method includes assigning the aggregated-event-reporting data-items to different event-reporting queues, each queuing at least one of the aggregated-event reporting data-items waiting to be forwarded to the collector node.

Moreover, in accordance with an embodiment of the present disclosure, the method includes assigning respective ones of the aggregated-event-reporting data-items to different priority event-reporting queues a respective count of events in the respective aggregated-event-reporting data-items.

Further in accordance with an embodiment of the present disclosure respective ones of the aggregated-event-reporting data-items include the flow and event-type information of the respective event-reporting data-items.

Still further in accordance with an embodiment of the present disclosure, the method includes computing a respective signature of the flow information of respective ones of the aggregated-event-reporting data-items, wherein respective ones of the aggregated-event-reporting data-items include the respective computed signature and respective event-type information.

Additionally, in accordance with an embodiment of the present disclosure, the method includes forwarding the respective computed signature and the flow information of a respective one of the aggregated-event-reporting data-items to the collector node responsively to the respective signature being computed an initial time from the flow information.

Moreover, in accordance with an embodiment of the present disclosure respective ones of the aggregated-event-reporting data-items include a cumulative event-count and a cumulative byte-count of the respective event-reporting data-items.

Further in accordance with an embodiment of the present disclosure, the method includes computing a measure of event burstiness of the events aggregated in each of the aggregated-event-reporting data-items each time the data of another one of the event-reporting data-items is aggregated into a respective one of the aggregated-event-reporting data-items.

Still further in accordance with an embodiment of the present disclosure the computing includes computing the measure of event burstiness of the events as a harmonic average.

Additionally, in accordance with an embodiment of the present disclosure the measure of event burstiness of the events for one of the aggregated-event-reporting data-items includes, for each respective one of a plurality of time-difference ranges, a count of adjacent events having a time difference within the respective time-difference range.

Moreover, in accordance with an embodiment of the present disclosure, the method includes preventing some of the event-reporting data-items from being input to the aggregating step.

There is also provided in accordance with still another embodiment of the present disclosure a software product, including a non-transient computer-readable medium in which program instructions are stored, which instructions, when read by a central processing unit (CPU), cause the CPU to transmit packets belonging to multiple flows to a packet data network, generate event-reporting data-items, each including flow and event-type information about a packet-related event occurring in a network device, aggregate, in the network device, data of at least some of the event-reporting data-items into aggregated-event-reporting data-items aggregated the flow and event-type information of the at least some event-reporting data-items, store the aggregated-event-reporting data-items in a memory, and forward one aggregated-event-reporting data-item of the aggregated-event-reporting data-items to a collector node, and purging the one aggregated-event-reporting data-item from the memory.

BRIEF DESCRIPTION OF THE DRAWINGS

The present invention will be understood from the following detailed description, taken in conjunction with the drawings in which:

FIGS. 3A-C are block diagram views of event aggregation according to other methods of operation of the systems of FIGS. 1A and 1B;

FIGS. 4A-C are schematic views illustrating event burstiness of events in the system of FIGS. 1A and 1B;

DESCRIPTION OF EXAMPLE EMBODIMENTS

Overview

Figure 1A:
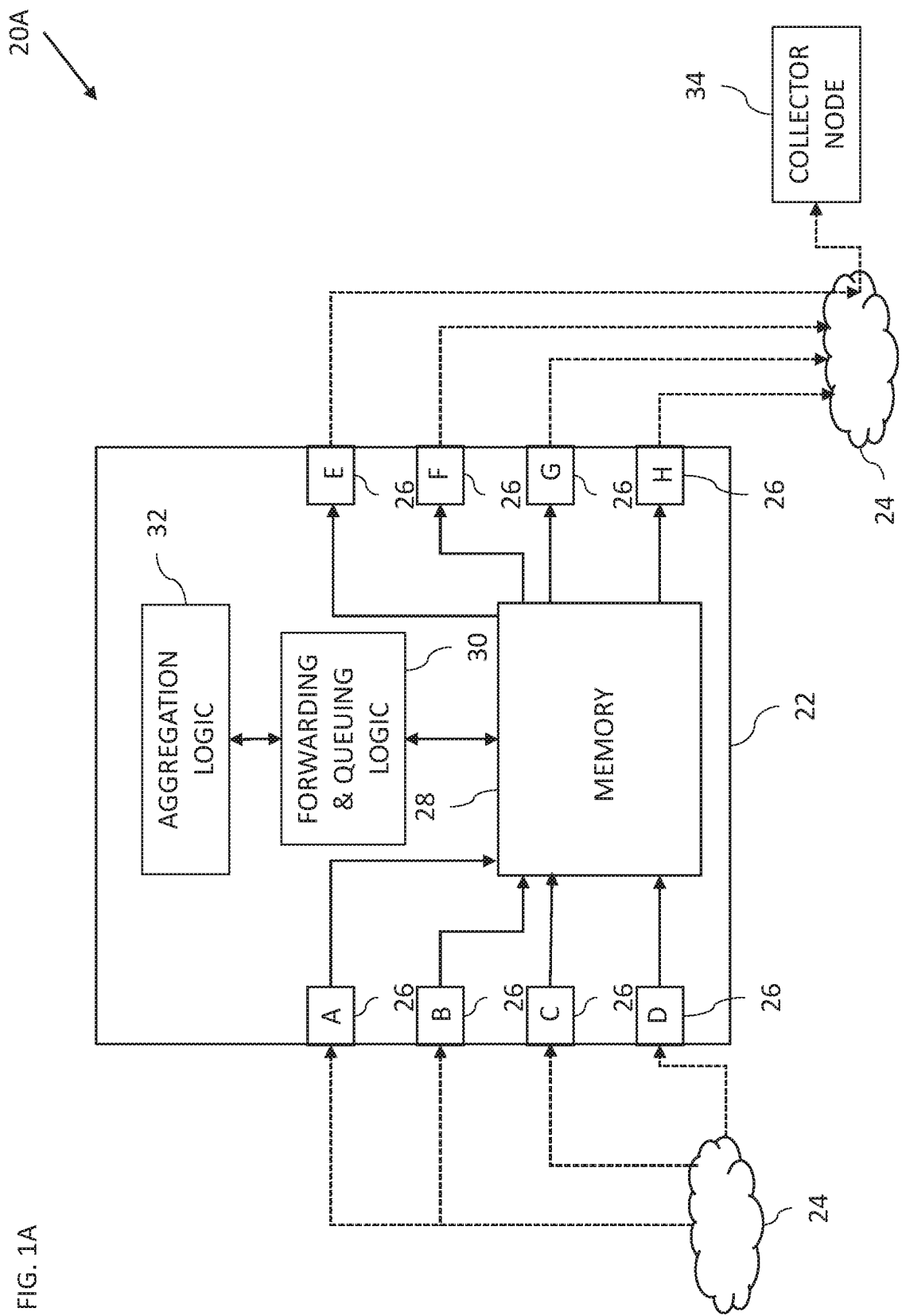
FIG. 1A is a block diagram view of a communication system constructed and operative in accordance with an embodiment of the present invention.

One type of telemetry information is based on counters that count a variety of events, such as the number of packets received on a port, or the number of routing accesses performed. Another type of telemetry information is based on a simple gauge that presents the instantaneous status of various resources in the network device, such as a current buffer fill level or a current bandwidth (BW) transmitted on a given port.

Yet another type of telemetry information is event driven where an indication is sent to a collector upon an event that occurred in the network device, such as a buffer that crossed a specific threshold, a packet that was dropped, or a latency exceeded a given threshold. The collector may be locally connected to the network device or connected to the network device via a network. The event may be reported using data that includes at least part of the packet involved in the event and additional metadata that describes various aspects of the event, for example, the event type and timestamp.

When the volume of events to be reported to a collector becomes larger than the available bandwidth for forwarding the event to the collector, some of the event data may be discarded in the network device. For example, some event data items which exceed the bandwidth of the port over which the event data is being sent to the collector may be dropped in accordance with a tail-drop mechanism such that when the queue storing the event data items is filled to its maximum capacity, the newly arriving event data items are dropped until the queue has enough room to accept incoming traffic. Some event data items may be filtered based on using a sampler and/or a policer. The discarding and filtering of the event data may lead to low visibility of events occurring on the network and also lead to poor debuggability of the network.

Embodiments of the present invention address these problems by aggregating data from multiple event in a network device which aggregates event data thereby reducing the amount of event data that needs to be sent to a collector node. The aggregated event data is forwarded to the collector node intermittently. The collector node may be locally connected to the network device or connected to the network device over a data packet network.

Control circuitry of the network device generates event-reporting data-items, each including flow and event-type information about a packet-related event occurring in the network device. Each event-reporting data-item may also include an event timestamp and a packet size of a packet of the packet-related event. A "flow" is typically identified by the values of a specified set of header fields, such as the IP and TCP/UDP 5-tuple of source and destination addresses, source and destination ports, and protocol, or any other suitable flow information such as layer 2, 3, 4 or tunnel data, which are consistent over all of the packets in the flow. The event-type information generally indicates the event-type associated with an event-reporting data-item, for example, but not limited to, expired time-to-live (TTL) value, illegal packet, or exceeded buffer limit.

The network device also includes aggregation circuitry which aggregates data of at least some of the event-reporting data-items into aggregated-event-reporting data-items aggregated according to the flow and event-type information of the respective event-reporting data-items. The event-reporting data-items may be filtered by an event reporting filter (such as a sampler and/or policer) to prevent some of the event-reporting data-items from being input to the aggregation circuitry.

Once an event-reporting data-item is received from the control circuitry, the aggregation circuitry searches its memory to determine whether the same flow and event-type pair is already stored in the memory. If the aggregation circuitry finds the same flow and event-type pair in the memory, the currently received event-reporting data-item is merged with the stored aggregated-event-reporting data-item for that flow and event-type pair by updating various fields of that aggregated-event-reporting data-item stored in the memory. If the aggregation circuitry does not find the same flow and event-type pair in the memory, a new aggregated-event-reporting data-item is created in the memory for that flow and event-type pair.

In some embodiments, the aggregation circuitry computes a signature of the flow information of the received event-reporting data-item and searches the memory to determine whether the same signature and event-type pair is already stored in the memory. If the aggregation circuitry finds the same signature and event-type pair in the memory, the currently received event-reporting data-item is merged with the stored aggregated-event-reporting data-item for that signature and event-type pair by updating various fields of that aggregated-event-reporting data-item stored in the memory. If the aggregation circuitry does not find the same signature and event-type pair in the memory, a new aggregated-event-reporting data-item is created in the memory for that signature and event-type pair.

Each aggregated-event-reporting data-item may include the following data, by way of example only: the flow (and/or signature) and event-type information of the aggregated-event-reporting data-item; the event timestamp of the first event-reporting data-item added to the aggregated-event-reporting data-item; the event timestamp of the last event-reporting data-item added to the aggregated-event-reporting data-item; the total number of events (event-count) aggregated into the aggregated-event-reporting data-item; the total number of bytes (cumulative byte-count) of the events aggregated into the aggregated-event-reporting data-item; and a measure of event burstiness that indicates a burstiness of the event included in the aggregated-event-reporting data-item. Burstiness may be defined as the intermittent increases and decreases in activity or frequency of the occurrence of events. Burstiness is discussed in more detail below in this overview section as well as with reference to disclosed embodiments herein.

The memory space assigned to the aggregation circuitry may be implemented in various ways, such as a hash table, multiple hash tables, or ternary content-addressable memory (TCAM). The size of the memory space is generally implementation dependent. A larger memory space generally leads to more aggregated-event-reporting data-item flows than can be stored leading to a better aggregation ratio.

Once the memory is full (reaching a threshold for storage of the aggregated-event-reporting data-items) or hash collision in case of hash tables, a replacement policy is applied. The replacement policy includes adding a newly created aggregated-event-reporting data-item to the memory in place of an existing aggregated-event-reporting data-item, which is purged from the memory and forwarded to the collector node. The replacement policy may be applied according to any suitable criteria, for example, but limited to, purging an existing aggregated-event-reporting data item which is least recently used, least frequently used, or randomly.

Additionally, or alternatively, the aggregated-event-reporting data-items may be purged from the memory, even if the memory is not full, and based on any suitable criteria, for example, but not limited to, time, based on an age of the aggregated-event-reporting data-items, based on aggregated-event-reporting data-items exceeding a given event count, or according to a timestamp value.

The purged aggregated-event-reporting data-item is added to an event-reporting queue. The aggregation and/or control circuitry manages the event-reporting queue queuing at least one purged aggregated-event-reporting data-item waiting to be forwarded to the collector node over an interface of the network device. The term "queuing", as used in the specification and claims, in all grammatical forms, is defined herein as maintaining a data structure that indicates a desired transmission order among packets waiting to be sent to a given destination and then choosing the packets for transmission based on the entries in the data structure.

In some embodiments, the aggregation and/or control circuitry manages a plurality of different event-reporting queues (at least some having different assigned priorities). In some embodiments the purged aggregated-event-reporting data-items are assigned to the different priority event-reporting queues according to a respective count of events in the respective purged aggregated-event-reporting data-items. In this way, high priority aggregated-event-reporting data-items (e.g., with high event counts) may be assigned to a high-priority event-queue and low priority aggregated-event-reporting data-items (e.g., with low event counts) to a low-priority event-queue to increase the probability that the high priority aggregated-event-reporting data-items are not dropped from their event-queue.

The aggregation circuitry may compute a measure of event burstiness of the events aggregated in each of the aggregated-event-reporting data-items each time the data of another event-reporting data-item is aggregated into a respective one of the aggregated-event-reporting data-items. The measure of event burstiness may be computed as a harmonic average.

In some embodiments, the measure of event burstiness of the events for one of the aggregated-event-reporting data-items includes, for each respective one of a plurality of time-difference ranges, a count of adjacent events having a time difference within the respective time-difference range. The respective counts of the respective time-difference ranges may be presented in the form of a histogram for manual analysis by a network administrator.

SYSTEM DESCRIPTION

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1A, which is a block diagram view of a communication system 20A constructed and operative in accordance with an embodiment of the present invention.

The operation of system 20A is illustrated by a communication apparatus 22, such as a switch, which has multiple interfaces, in the form of ports 26, connected to a packet data network 24, such as an Ethernet or InfiniBand switch fabric.

The ports 26 typically comprise suitable physical-layer (PHY) and data-link layer interface circuits, as are known in the art. Ports 26, which are labeled with letters A-H for clarity in the description that follows, are configured to serve as ingress and egress ports (or equivalently, ingress and egress interfaces) to network 24. Although for the sake of illustration, ports 26A-D serve in FIG. 1 as ingress ports, while ports 26E-H serve as egress ports, in practice all ports 26 are typically configured for bidirectional operation, as both ingress and egress ports.

Ports 26A-D receive packets from network 24 belonging to multiple flows, for forwarding to respective egress interfaces for transmission to the network. Assuming network 24 to be an Internet Protocol (IP) network, packet flows can be identified by the packet 5-tuple (source and destination IP addresses and ports, along with the transport protocol). Alternatively, any other suitable flow identifier may be used based on layer 2, 3, 4 or tunnel data.

The communication apparatus 22 comprises control circuitry, in the form of forwarding and queuing logic 30, which forwards incoming packets to the appropriate egress ports 26E-F for transmission to network 24. Logic 30 queues the packets that are destined for each egress port in transmit queues in a memory 28, while the packets await their turn for transmission. Logic 30 does not necessarily transmit the packets through a given egress port in their order of arrival, however, but rather may give higher priority to certain queues over others.

The configurations of communication apparatus 22 and network 24 that are shown in FIG. 1 are example configurations, which are chosen purely for the sake of conceptual clarity. In alternative embodiments, any other suitable network and/or switch configuration can be used. Logic 30 in communication apparatus 22 typically comprises hard-wired or programmable logic circuits, such as one or more Application-Specific Integrated Circuits (ASICs) or Field-Programmable Gate Arrays (FPGAs). Alternatively, or additionally, at least some of the functions of logic 30 may be implemented in software or firmware running on a programmable processor.

In some embodiments, the communication apparatus 22 may be implemented as any suitable communication apparatus or network device, for example, but not limited to, a router or a network interface card (NIC), which may include an interface (e.g., Peripheral Component Interconnect Express (PCIe) interface) with a host device and one or more interfaces, e.g., port(s) 26 with the packet data network 24.

The forwarding and queuing logic 30 is also configured to monitor for packet-related events (e.g., a buffer limit being exceeded, and/or a packet being dropped) and generate event-reporting data-items, as described in more detail with reference to FIG. 6. Each event-reporting data-item includes flow and event-type information about a packet-related event occurring in the network device. Each event-reporting data-item also includes an event timestamp and a packet size of a packet of the packet-related event. A "flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow. The event-type information generally indicates the event-type associated with an event-reporting data-item, for example, but not limited to, expired TTL, illegal packet, or exceeded buffer limit.

The forwarding and queuing logic 30 may also run samplers and/or policers (collectively referred to as an event reporting filter) to filter some of the event-reporting data-items to prevent some of the event-reporting data-items from being input to aggregation circuitry, described below.

The communication apparatus 22 comprises aggregation circuitry, in the form of aggregation logic 32, which is configured to aggregate data of at least some of the event-reporting data-items into aggregated-event-reporting data-items aggregated according to the flow and event-type information of the respective event-reporting data-items. In some embodiments, the flow information may be in the form of a signature which is computed from the flow information, as described in more detail with reference to FIG. 8.

Each aggregated-event-reporting data-item may include the following data, by way of example only: flow information (and/or a signature of the flow information) and event-type information of the aggregated-event-reporting data-item; the event timestamp of the first event-reporting data-item added to the aggregated-event-reporting data-item; the event timestamp of the last event-reporting data-item added to the aggregated-event-reporting data-item; the total number of events (event-count) aggregated into the aggregated-event-reporting data-item; the total number of bytes (cumulative byte-count) of the events aggregated into the aggregated-event-reporting data-item; and a measure of event burstiness that indicates a burstiness of the event included in the aggregated-event-reporting data-item. Burstiness may be defined as the intermittent increases and decreases in activity or frequency of the occurrence of events. Burstiness is discussed in more detail below with reference to FIGS. 4-5.

The aggregation logic 32 is configured to store the aggregated-event-reporting data-items in the memory 28. The memory space assigned to the aggregation logic 32 may be implemented in various ways, such as a hash table, multiple hash tables, or ternary content-addressable memory (TCAM). The size of the memory space is generally implementation dependent. A larger memory space generally leads to more aggregated-event-reporting data-item flows than can be stored leading to a better aggregation ratio.

The aggregation logic 32 is configured to forward one of the aggregated-event-reporting data-items of the aggregated-event-reporting data-items to a collector node 34, which is connected to the communication apparatus 22 over the data packet network 24, and purge that aggregated-event-reporting data-item from the memory 28, responsively to the memory 28 reaching a threshold for storage of the aggregated-event-reporting data-items.

In some embodiments, once the memory 28 is full (reaching a threshold for storage of the aggregated-event-reporting data-items) or hash collision in case of hash tables, a replacement policy is applied. The replacement policy includes the aggregation logic 32 adding a newly created aggregated-event-reporting data-item to the memory 28 in place of an existing aggregated-event-reporting data-item, which is purged from the memory 28 and forwarded to the collector node 34. The replacement policy may be applied according to any suitable criteria, for example, but limited to, purging an existing aggregated-event-reporting data item which is least recently used, least frequently used, or randomly.

Additionally, or alternatively, the aggregated-event-reporting data-items may be purged from the memory, even if the memory is not full, and based on any suitable criteria, for example, but not limited to, time, based on an age of the aggregated-event-reporting data-items, based on aggregated-event-reporting data-items exceeding a given event count, or according to a timestamp value.

The purged aggregated-event-reporting data-item is added to an event-reporting queue, described in more detail with reference to FIGS. 2 and 3. The forwarding and queuing logic 30 manages the event-reporting queue(s) queuing the purged aggregated-event-reporting data-item(s) waiting to be forwarded to the collector node 34 over a given egress interface 26 of the communication apparatus 22. In embodiments, where the forwarding and queuing logic 30 manages multiple event-reporting queues, the aggregation logic 32 assigns a purged aggregated-event-reporting data-item to one of the event-reporting queues and includes data indicative of the assigned event-reporting queue in the purged aggregated-event-reporting data-item so that the forwarding and queuing logic 30 may assign the purged aggregated-event-reporting data-item to the event-reporting queue assigned by the aggregation logic 32. The forwarding and queuing logic 30 performs arbitration of the queues.

The aggregation logic 32 in communication apparatus 22 typically comprises hard-wired or programmable logic circuits, such as one or more Application-Specific Integrated Circuits (ASICs) or Field-Programmable Gate Arrays (FPGAs). Alternatively, or additionally, at least some of the functions of aggregation logic 32 may be implemented in software or firmware running on a programmable processor. The operation of the aggregation logic 32 is described in more detail with reference to FIGS. 2-8 below.

Figure 1B:
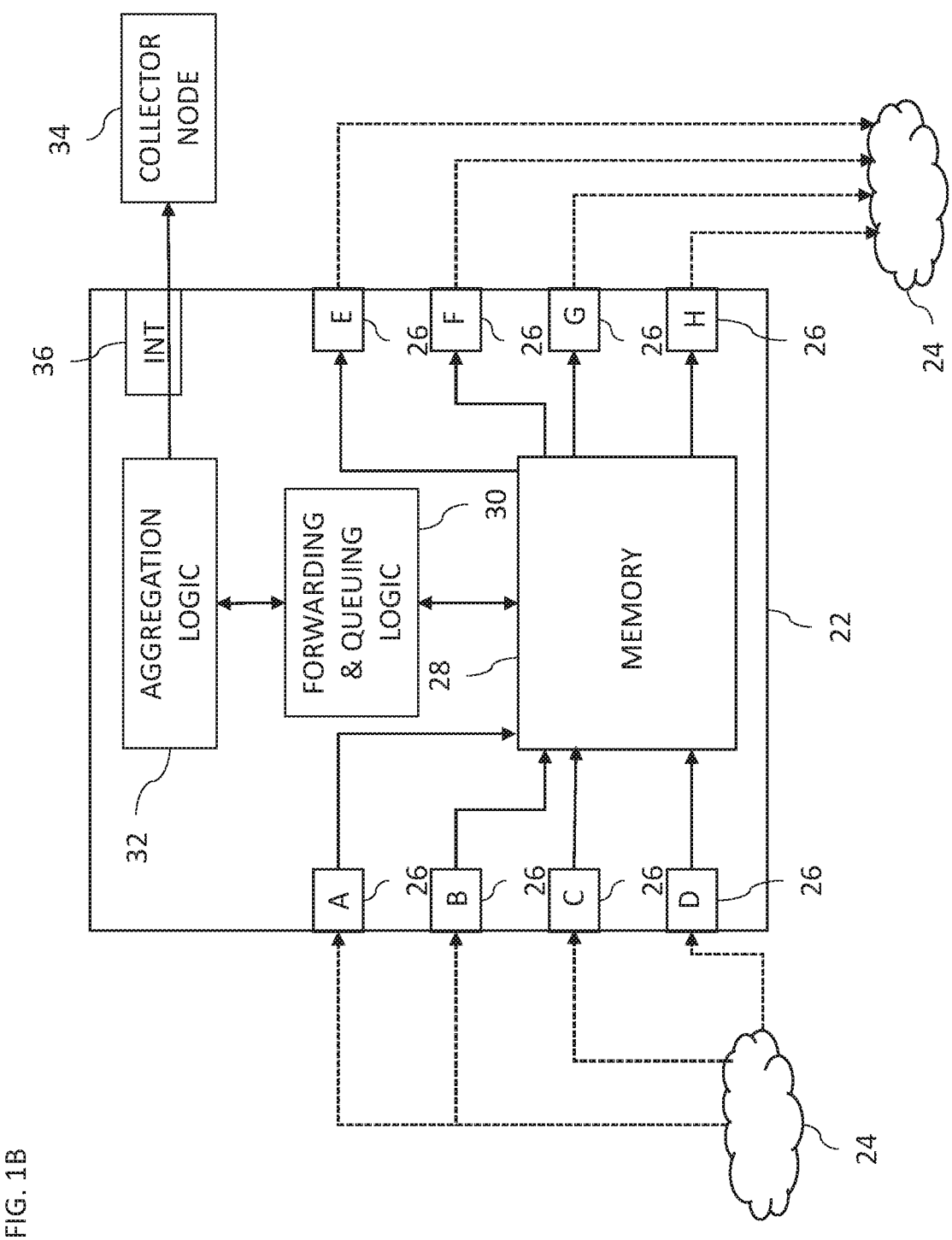
FIG. 1B is a block diagram view of an alternative communication system constructed and operative in accordance with an embodiment of the present invention.

Reference is now made to FIG. 1B, which is a block diagram view of an alternative communication system 20B constructed and operative in accordance with an embodiment of the present invention. The communication system 20B is substantially the same as the communication system 20A, except that the collector node 34 is locally connected to the communication apparatus 22 via an interface 36, such as a PCIe interface. The aggregation logic 32 manages the event-reporting queue(s) queuing the purged aggregated-event-reporting data-item(s) waiting to be forwarded to the collector node 34 over the interface 36. The aggregation logic 32 performs arbitration of the queues, as necessary.

Figure 2:
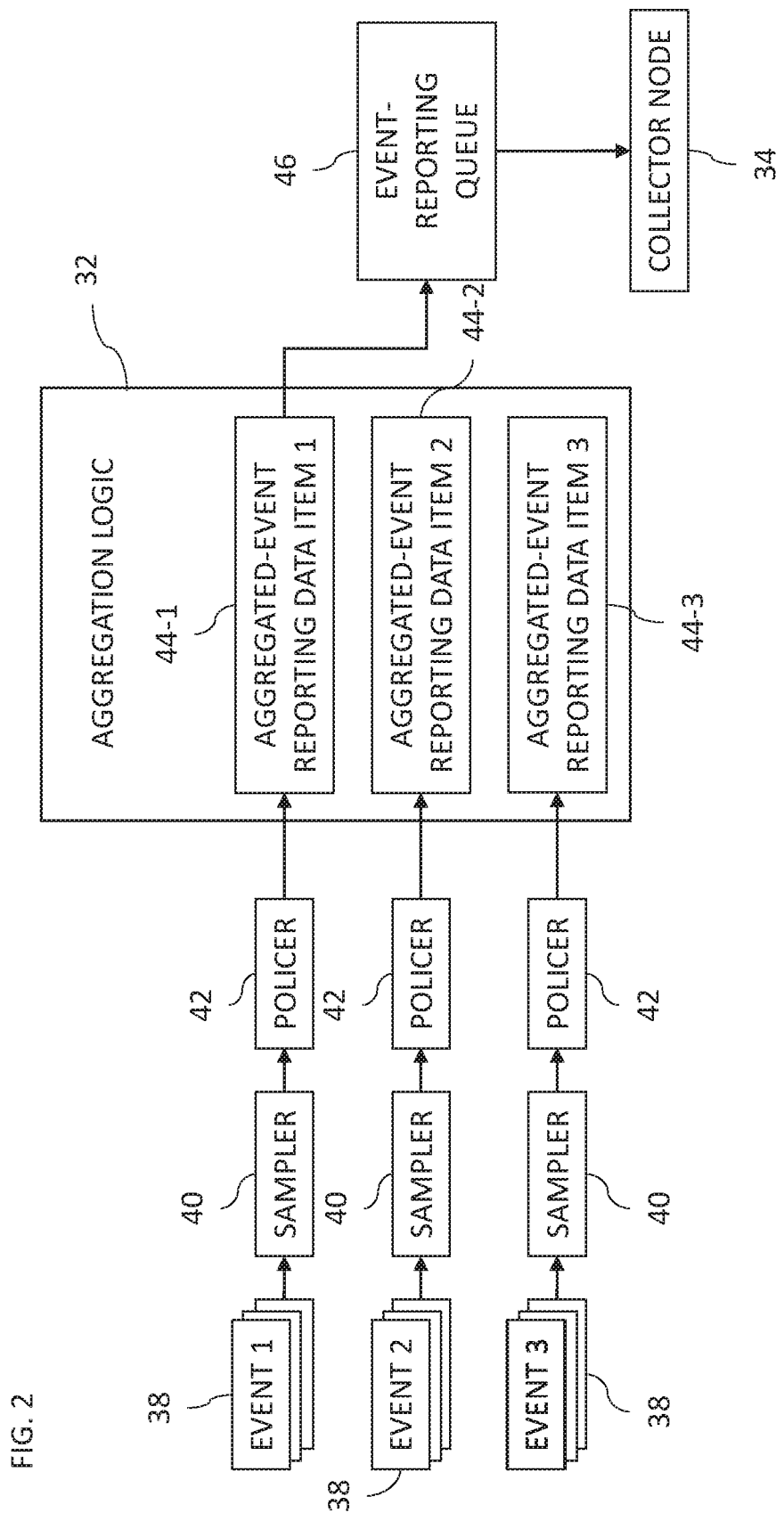
FIG. 2 is a block diagram view of event aggregation is according with a first method of operation of the systems of FIGS. 1A and 1B.

Reference is now made to FIG. 2, which is a block diagram view of event aggregation is according with a first method of operation of the systems 20A, 20B of FIGS. 1A and 1B. FIG. 2 shows event-reporting data-items 38 generated by the forwarding and queuing logic 30 (FIG. 1A, 1B) for three flow/event-type pairs. In other words, the event-reporting data-items 38 labeled "event 1" are generated for one flow and event-type, the event-reporting data-items 38 labeled "event 2" are generated for a different flow and event-type, and the event-reporting data-items 38 labeled "event 3" are generated for another flow and event-type. The event-reporting data-items 38 of each flow/event-type pair are filtered with a sampler 40 and a policer 42 run by the forwarding and queuing logic 30. The samplers 40 use event sampling to reduce the number of event-reporting data-items 38 (for example, sampling one out of n events and forwarding that one event to the aggregation logic 32). The sampling rate may be based on the event type, and/or port, and/or any other suitable criteria. The policer 42 also reduces the number of event-reporting data-items 38 based on the event type, and/or port, and/or any other suitable criteria (for example, limiting the number of packets forwarded to the aggregation logic 32 based on the rate of the events, such as, allowing X packets to be forwarded to the aggregation logic 32 in a millisecond).

The event-reporting data-items 38 that are not filtered by the sampler 40 and the policer 42 are then aggregated into aggregated-event-reporting data-items 44 by the aggregation logic 32. The event-reporting data-items 38 of "event 1" are aggregated into aggregated-event-reporting data-item 44-1. The event-reporting data-items 38 of "event 2" are aggregated into aggregated-event-reporting data-item 44-2. The event-reporting data-items 38 of "event 3" are aggregated into aggregated-event-reporting data-item 44-3. A respective one of the aggregated-event-reporting data-items 44 is updated when a respective one of the event-reporting data-items 38 is received by the aggregation logic 32.

The aggregated-event-reporting data-items 44 are periodically purged from the memory 28 (FIGS. 1A, 1B) and added to an event-reporting queue 46 for transmission the collector node 34 via one of the ports 26 (FIGS. 1A, 1B).

The aggregation allows the sampler 40 and the policer 42 to filter less event-reporting data-items 38 compared to a system which does not use aggregation to aggregate the event-reporting data-items 38. Therefore, more of the source data represented by the event-reporting data-items 38 is preserved in the aggregated-event-reporting data-items 44 as compared to a system that does not use aggregation. Nevertheless, in some scenarios, with very high volumes of event-reporting data-items 38, some of the aggregated-event-reporting data-items 44 may be discarded at the event-reporting queue 46 due to a tail-drop mechanism. FIG. 3 below describes a method to address the problem of aggregated-event-reporting data-items 44 being discarded.

Figure 3C:
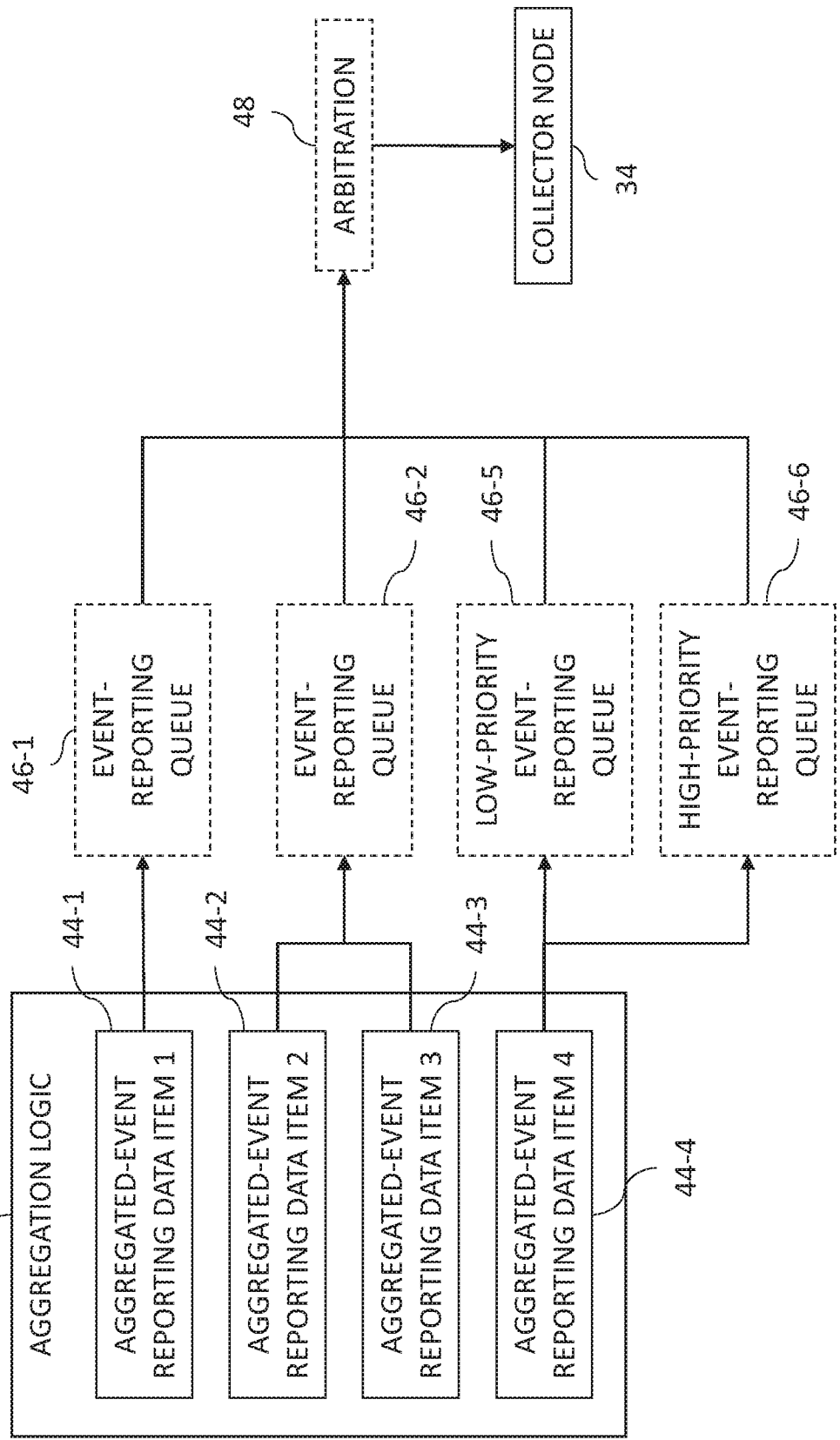

Reference is now made to FIGS. 3A-C, which are block diagram views of event aggregation according to other methods of operation of the systems 20A, 20B of FIGS. 1A and 1B. 4.

FIG. 3A shows three event-reporting queues 46-1, 46-2, 46-3. When an aggregated-event-reporting data-item 44 is purged from the memory 28, it may be queued in any of the event-reporting queues 46-1, 46-2, 46-3 according to suitable criteria. For example, an aggregated-event-reporting data-item 44 may be assigned to the shortest one of the event-reporting queues 46-1, 46-2, 46-3 for forwarding to the collector node 34. Therefore, the aggregation logic 32 is configured to assign the aggregated-event-reporting data-items 44 to different event-reporting queues 46, each queuing at least one of the aggregated-event reporting data-items 44 waiting to be forwarded to the collector node 34 over one of the multiple interfaces. The forwarding and queuing logic 30 (or the aggregation logic 32) then serves the event-reporting queues 46-1, 46-2, 46-3 by arbitrating (block 48) between the queues, for example, based on round-robin or any other suitable criteria.

FIG. 3B shows that the aggregated-event-reporting data-items 44 may be categorized into low-priority and high-priority events. For example, low count (less than or equal to a threshold count) aggregated-event-reporting data-items 44 with a low count of event-reporting data-items 38 may be assigned as low-priority, while high count (greater than the threshold count) aggregated-event-reporting data-items 44 with a high count of event-reporting data-items 38 may be assigned as high-priority.

When a low-priority aggregated-event-reporting data-item 44 is purged from the memory 28, it is queued in a low-priority event-reporting queue 46-5 for forwarding to the collector node 34, and when a high-priority aggregated-event-reporting data-item 44 is purged from the memory 28, it is queued in a high-priority event-reporting queue 46-4 for forwarding to the collector node 34. Therefore, in general the aggregation logic 32 is configured to assign respective ones of the aggregated-event-reporting data-items 44 to the different priority event-reporting queues 46 according to a respective count of events in the respective aggregated-event-reporting data-items 44 or any suitable criteria.

The forwarding and queuing logic 30 (or the aggregation logic 32) then serves the event-reporting queues 46-4, 46-5, by arbitrating (block 48) between the queues in accordance with the priority of the queues 46. Therefore, there is a greater probability that a low-priority aggregated-event-reporting data-item 44 (e.g., with low event counts) will be discarded than a high-priority aggregated-event-reporting data-item 44 (e.g., with high event counts). In some embodiments, there may be more than two, different priority, event-reporting queues 46.

FIG. 3C shows four event-reporting queues 46-1, 46-2, 46-5, 46-6. The aggregated-event reporting data-item 44-1 is assigned to the event-reporting queue 46-1. The aggregated-event reporting data-items 44-2, 44-3 are assigned to the event-reporting queue 46-2. Data of the aggregated-event reporting data-item 44-4 may be assigned to the low-priority event-reporting queue 46-5 or the high-priority event-reporting queue 46-6 according to any suitable criteria. For example, a correlation message (described in more detail with reference to FIG. 8) may be assigned to the high-priority event-reporting queue 46-6, while the rest of the aggregated-event reporting data-item 44-4 may be assigned to the low-priority event-reporting queue 46-5. The forwarding and queuing logic 30 (or the aggregation logic 32) then serves the event-reporting queues 46-1, 46-2, 46-5, 46-6, by arbitrating (block 48) between the queues in accordance with the priority of the queues 46.

Reference is now made to FIGS. 4A-C, which are schematic views illustrating event burstiness of events in the systems 20A, 20B of FIGS. 1A and 1B.

When the event-reporting data-items 38 are aggregated into the respective aggregated-event-reporting data-items 44, data such as the event count, byte count, and flow information of the event-reporting data-items 38 is still preserved. However, saving all the event timestamps in the aggregated-event-reporting data-items 44 although possible, is generally impractical.

The event timestamps provide useful information with respect to the timing of the events. For example, FIG. 4A shows N−1 events in one cluster followed by a single event at time T1. FIG. 4B shows two clusters of (N−1)/2 events followed by a single event at time T1. FIG. 4C shows that the N events are evenly spread between time T0 and time T1.

In some embodiments, the timing of the events may be quantified using a measure of event burstiness. Burstiness may be defined as the intermittent increases and decreases in activity or frequency of the occurrence of events. The burstiness of the events shown in FIG. 4A is higher than the burstiness of the events shown in FIG. 4B, which is in turn higher than the burstiness of the events shown in FIG. 4C.

In some embodiments, the aggregation logic 32 (FIGS. 1A, 1B) is configured to compute a measure of event burstiness of the events aggregated in each of the aggregated-event-reporting data-items 44, each time the data of another one of the event-reporting data-items 38 is aggregated into a respective one of the aggregated-event-reporting data-items 44.

There are several methods to compute burstiness. The methods are generally based on the time difference between adjacent event-reporting data-items 38. The aggregation logic 32 saves the timestamp of the previous event-reporting data-item 38 aggregated into one of the aggregated-event-reporting data-items 44 so that when a new event-reporting data-item 38 having its own timestamp is received, the difference between the timestamp of the new event-reporting data-item 38 and the previous event-reporting data-item 38 may be computed. The timestamp of the new event-reporting data-item 38 is then saved in the aggregated-event-reporting data-item 44 as the previous event-reporting data-item 38, for future use.

In some embodiments, the aggregation logic 32 is configured to compute the measure of event burstiness of the events as a harmonic average. For example, the burstiness of n+1 events having time differences between adjacent events of $t_1, t_2, t_3 \ldots t_n$ may be expressed as a harmonic average, H, as follows:

$$H = \frac{n}{\frac{1}{t_1} + \frac{1}{t_2} + \frac{1}{t_3} \ldots + \frac{1}{t_n}}$$

The harmonic average is first computed for time different t1. The harmonic average is then stored in the relevant aggregated-event-reporting data-item 44. Each time a time difference between adjacent event-reporting data-items 38 is computed, the aggregation logic 32 reads the previously stored harmonic average, and computes a new harmonic average based on the previously stored harmonic average and the newly computed time difference. The newly computed harmonic average is stored as the measure of event burstiness.

Figure 5:
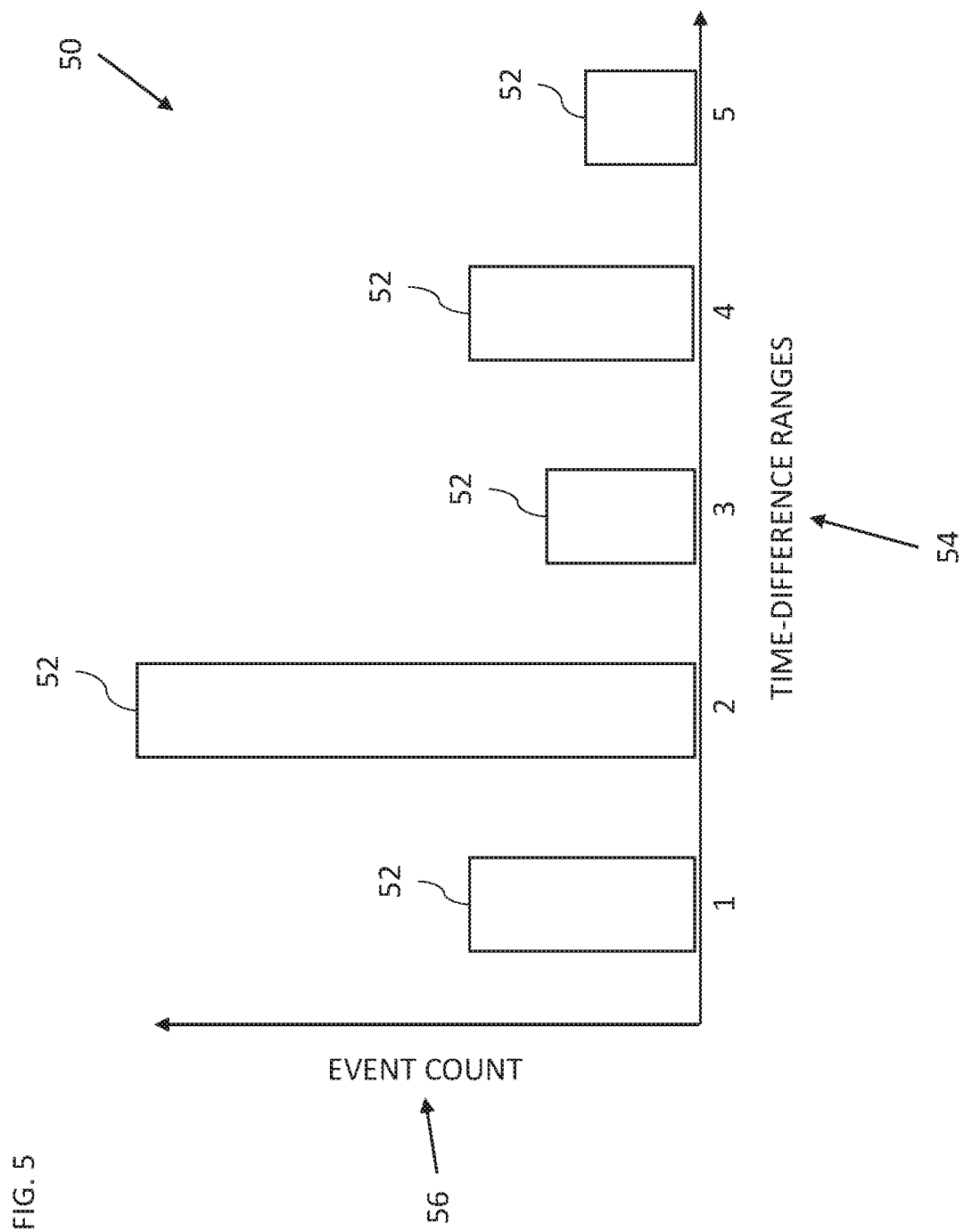
FIG. 5 is a view of a histogram representing event burstiness in the system of FIGS. 1A and 1B.

Reference is now made to FIG. 5, which is a view of a histogram 50 representing event burstiness in the systems 20A, 20B of FIGS. 1A and 1B.

The histogram 50 shows bars 52 for different time-difference ranges 54. The height of each bar 52 is indicative of a count 56 of adjacent events having a time difference within the time-difference range of that bar 52.

The aggregation logic 32 may be configured to compute the measure of event burstiness of the events for one of the aggregated-event-reporting data-items 44 to include, for each respective one of the time-difference ranges 54, the count 56 of adjacent events having a time difference within the respective time-difference range 54. The aggregation logic 32 maintains a count for each time-difference range 54 in the aggregated-event-reporting data-items 44. One of the counts is updated each time one of the event-reporting data-items 38 is aggregated into that aggregated-event-reporting data-item 44. The number of time-difference ranges 54 and the time window of each of the time-difference ranges 54 may be implementation dependent, for example, according to the amount of available memory, according to the number of expected aggregated-event-reporting data-items 44, and/or according to the data analysis needs of the network administrator.

The count for each time-difference range 54 may then be extracted to generate the histogram 50 and render the histogram 50 to a display for a network administrator to analyze.

Figure 6:
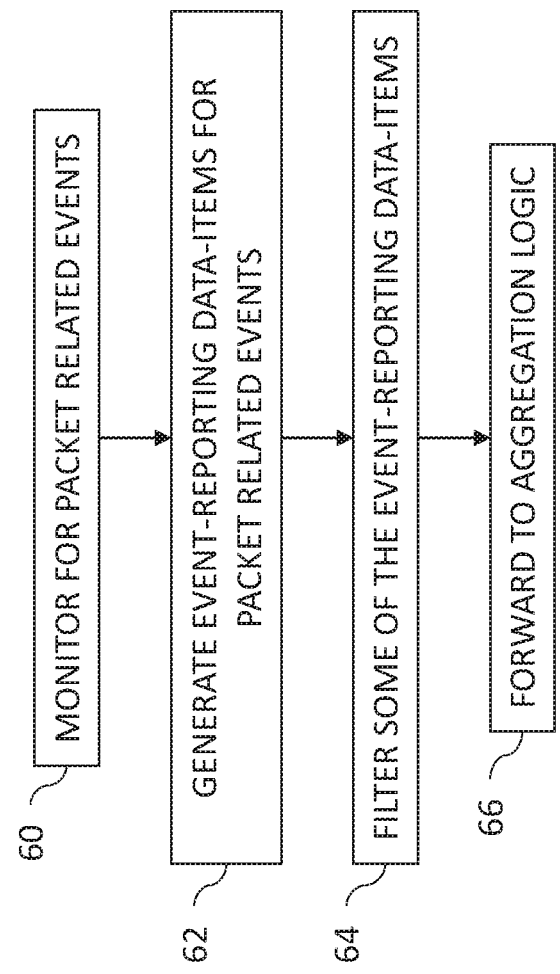
FIG. 6 is a flowchart including steps in a method of generating event-reporting and filtering for use in the systems of FIGS. 1A and 1B.

Reference is now made to FIG. 6, which is a flowchart 58 including steps in a method of generating event-reporting and filtering for use in the systems 20A, 20B of FIGS. 1A and 1B. The forwarding and queuing logic 30 (FIGS. 1A, 1B) is configured to monitor (block 60) for packet related events, for example, but not limited to, illegal packets, dropped packets, buffer overflow, and exceeding a buffer limit. The forwarding and queuing logic 30 is configured to generate (block 62) the event-reporting data-items 38 for packet related events. The event-reporting data-items 38 may include a copy of the packet or part thereof, e.g., data from the packet header. The forwarding and queuing logic 30 is configured to filter (block 64) some of the event-reporting data-items 38 from reaching the aggregation logic 32 (FIGS. 1A, 1B). The forwarding and queuing logic 30 is configured to forward (block 66) the event-reporting data-items 38, or a link to the event-reporting data-items 38 in the memory 28 (FIGS. 1A, 1B), to the aggregation logic 32.

Figure 7:
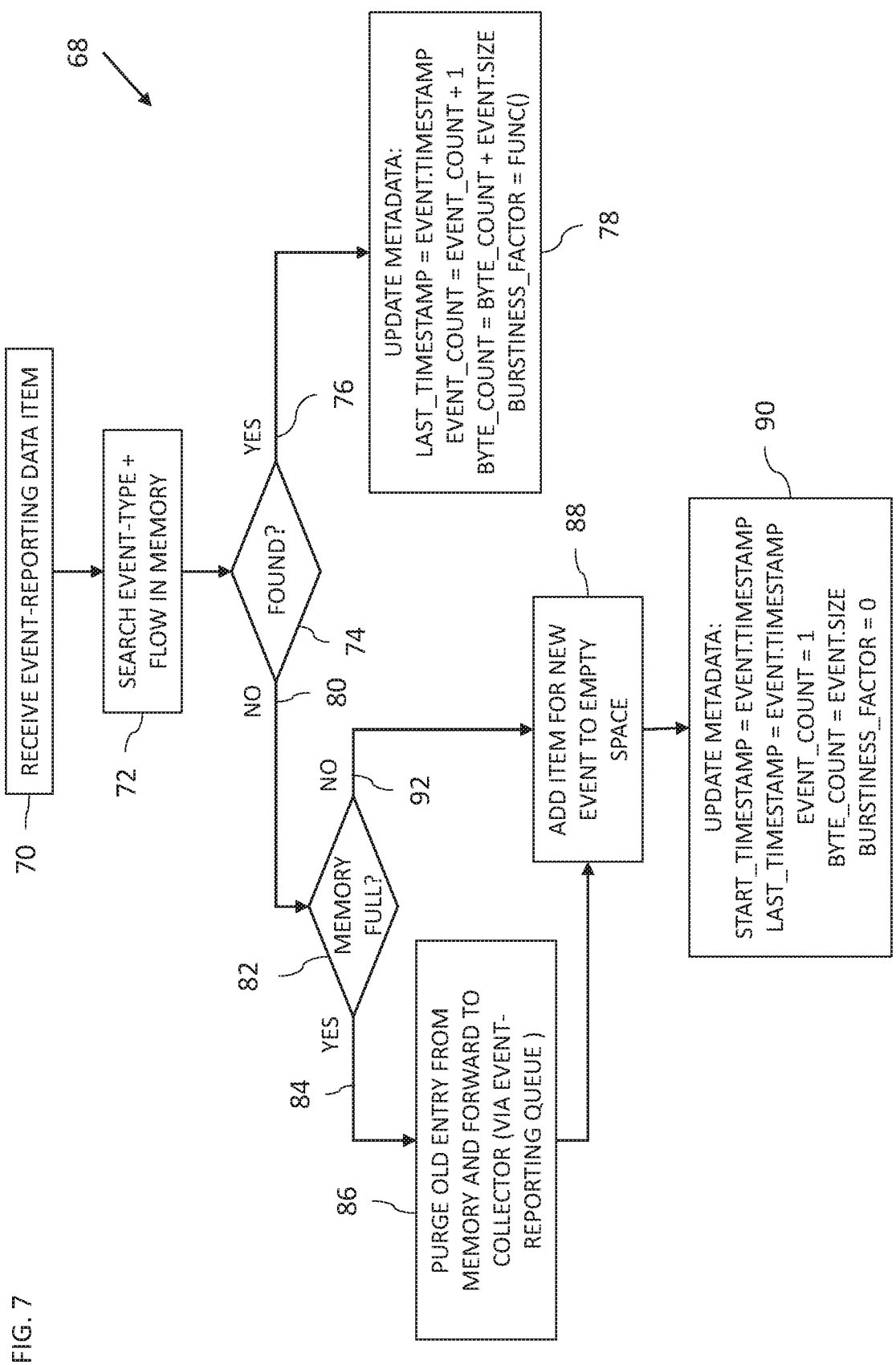
FIG. 7 is a flowchart including steps in an aggregation method for use in the systems of FIGS. 1A and 1B.

Reference is now made to FIG. 7, which is a flowchart 68 including steps in an aggregation method for use in the systems 20A, 20B of FIGS. 1A and 1B. Reference is also made to FIG. 2. The aggregation logic 32 is configured to receive (block 70) one of the event-reporting data-items 38. The aggregation logic 32 is configured to search (block 72) for the event-type and flow of the received event-reporting data-item 38 among the aggregated-event-reporting data-items 44 stored in the memory 28 (FIGS. 1A, 1B). At a decision block 74, if the event-type and flow of the received event-reporting data-item 38 was found (block 76) among the aggregated-event-reporting data-items 44, the aggregation logic 32 is configured to update (block 78) the aggregated-event-reporting data-item 44 including: updating the last_timestamp to equal the timestamp of the received event-reporting data-item 38; incrementing the event count by 1; incrementing the byte_count by a packet size of a packet of the packet-related event of the event-reporting data-item 38; and updating the measure of burstiness (burstiness factor) for the received event-reporting data-item 38.

If the event-type and flow of the received event-reporting data-item 38 was not found (branch 80), the aggregation logic 32 checks (decision block 82) if the memory 28 allocated for storage of the aggregated-event-reporting data-items 44 is full. If the memory is full (branch 84), the aggregation logic 32 is configured to purge (block 86) an existing aggregated-event-reporting data-item 44 from the memory 28 and forward the purged aggregated-event-reporting data-item 44 to the collector node 34 (FIGS. 1A, 1B). The aggregation logic 32 is configured to add (block 88) a new aggregated-event-reporting data-item 44 to the memory 28 and update (block 90) the data of the new aggregated-event-reporting data-item 44 from the received event-reporting data-item 38 including: the flow, the event-type, setting the start_timestamp and last_timestamp to equal the timestamp of the received event-reporting data-item 38; setting the event count to equal 1; setting the byte_count to equal a packet size of a packet of the packet-related event of the received event-reporting data-item 38; and setting the measure of burstiness to equal zero. If the memory is not full (branch 92), the steps of blocks 88 and 90 are performed without needing to perform the step of block 86.

Figure 8:
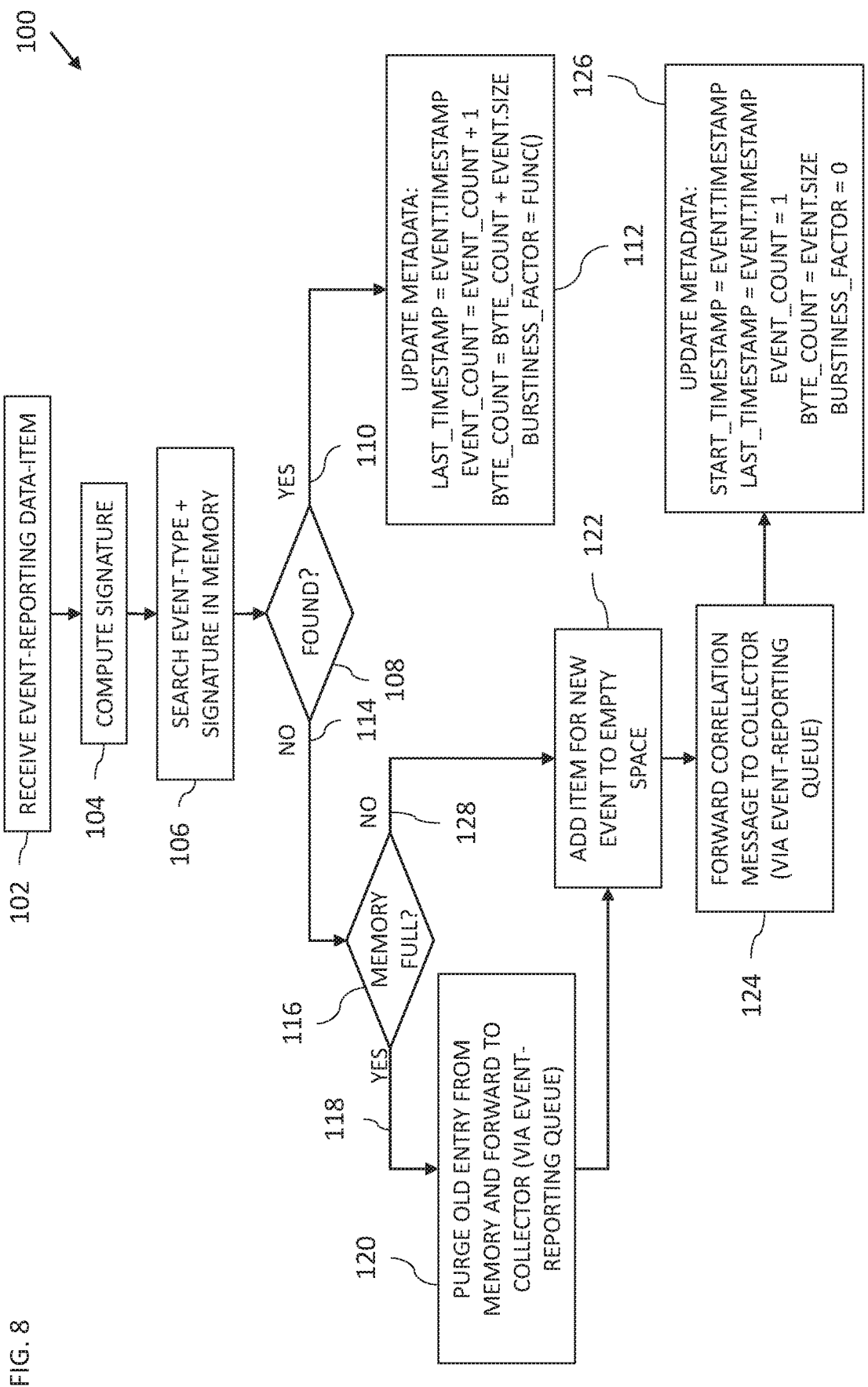
FIG. 8 is a flowchart including steps in an alternative aggregation method for use in the systems of FIGS. 1A and 1B.

Reference is now made to FIG. 8, which is a flowchart 100 including steps in an alternative aggregation method for use in the systems 20A, 20B of FIGS. 1A and 1B. Reference is also made to FIG. 2.

The flow information used as a key, and stored in each of the aggregated-event-reporting data-items 44 may be large due to the packet parameters to be stored. For example, the flow information may include an outer IPv6 header as well as an inner IPv6 header in case of tunneled packets. To reduce the size of the flow information, the aggregation logic 32 may compute a signature of the flow information instead of storing the original flow information. The signature (representing the flow information) may then be stored in the respective aggregated-event-reporting data-item 44 instead of the respective original flow information. To prevent collisions between two flows having the same signature, the computed signature should be significantly larger than the number of flows that the communication apparatus 22 handles leading to a very low probability of collision. The definition of significantly larger is implementation dependent and typically depends on how sensitive the communication system 20 is to collisions between two flows. In some embodiments, the probability of collision may be less than 10-12. In rare cases where a collision occurs two or more flows may then be considered as a single flow. Therefore, the aggregation logic 32 is configured to compute a respective signature of the flow information of respective ones of the aggregated-event-reporting data-items 44 so that the respective aggregated-event-reporting data-items 44 include the respective computed signature and respective event-type information.

When one of the aggregated-event-reporting data-items 44 is purged from the memory 28 and forwarded to the collector node 34, the flow information of the purged aggregated-event-reporting data-item 44 is not explicitly included in the purged aggregated-event-reporting data-item 44. Therefore, when a new aggregated-event-reporting data-item 44 is created, the flow information and the computed signature are forwarded to the collector node 34 to be used by the collector node 34 to find the flow information associated with a signature of a future purged aggregated-event-reporting data-item 44. Therefore, the aggregation logic 32 is configured to forward the respective computed signature and the flow information of a respective one of the aggregated-event-reporting data-items 44 to the collector node 34 responsively to the respective signature being computed initially from the flow information.

The steps of the flowchart 100 are now described in more detail.

The aggregation logic 32 is configured to receive (block 102) one of the event-reporting data-items 38. The aggregation logic 32 is configured to compute (block 104) a signature of the flow information. The aggregation logic 32 is configured to search (block 106) for the event-type and signature of the received event-reporting data-item 38 among the aggregated-event-reporting data-items 44 stored in the memory 28 (FIGS. 1A, 1B). At a decision block 108, if the event-type and flow of the received event-reporting data-item 38 was found (block 110) among the aggregated-event-reporting data-items 44, the aggregation logic 32 is configured to update (block 112) the relevant aggregated-event-reporting data-item 44 including: updating the last_timestamp to equal the timestamp of the received event-reporting data-item 38; incrementing the event count by 1; incrementing the byte_count by a packet size of a packet of the packet-related event of the event-reporting data-item 38; and updating the measure of burstiness (burstiness factor) for the received event-reporting data-item 38.

If the event-type and computed signature of the received event-reporting data-item 38 was not found (branch 114), the aggregation logic 32 checks (decision block 116) if the memory 28 allocated for storage of the aggregated-event-reporting data-items 44 is full. If the memory is full (branch 118), the aggregation logic 32 is configured to purge (block 120) an existing aggregated-event-reporting data-item 44 from the memory 28 and forward the purged aggregated-event-reporting data-item 44 to the collector node 34 (FIGS. 1A, 1B). The aggregation logic 32 is configured to add (block 122) a new aggregated-event-reporting data-item 44 to the memory 28, forward (block 124) a correlation message correlating the computed signature with the flow information of the received event-reporting data-item 38 to the collector node 34, and update (block 126) the data of the new aggregated-event-reporting data-item 44 from the received event-reporting data-item 38 including: the computed signature, the event-type, setting the start_timestamp and last_timestamp to equal the timestamp of the received event-reporting data-item 38; setting the event count to equal 1; setting the byte_count to equal a packet size of a packet of the packet-related event of the received event-reporting data-item 38; and setting the measure of burstiness to equal zero. If the memory is not full (branch 128), the steps of blocks 122, 124 and 126 are performed without needing to perform the step of block 120.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device, comprising:
multiple interfaces including at least one egress interface, which is configured to transmit packets belonging to multiple flows to a packet data network;
control circuitry configured to generate event-reporting data-items, each including flow and event-type information about a packet-related event occurring in the network device;
a memory; and
aggregation circuitry configured to:
aggregate data of at least some of the event-reporting data-items into aggregated-event-reporting data-items aggregated according to the flow and event-type information of the at least some event-reporting data-items;
store the aggregated-event-reporting data-items in the memory; and
forward one aggregated-event-reporting data-item of the aggregated-event-reporting data-items to a collector node, and purge the one aggregated-event-reporting data-item from the memory.

2. The device according to claim 1, wherein the aggregation circuitry is configured to forward the one aggregated-event-reporting data-item to the collector node, and purge the one aggregated-event-reporting data-item from the memory, responsively to the memory reaching a threshold for storage of the aggregated-event-reporting data-items.

3. The device according to claim 1, wherein the aggregation circuitry is configured to assign the one aggregated-event-reporting data-item to an event-reporting queue queuing at least one of the aggregated-event reporting data-items waiting to be forwarded to the collector node over one of the multiple interfaces.

4. The device according to claim 1, wherein the aggregation circuitry is configured to assign the aggregated-event-reporting data-items to different event-reporting queues, each queuing at least one of the aggregated-event reporting data-items waiting to be forwarded to the collector node over one of the multiple interfaces.

5. The device according to claim 1, wherein the aggregation circuitry is configured to assign respective ones of the aggregated-event-reporting data-items to different priority event-reporting queues according to a respective count of events in the respective aggregated-event-reporting data-items.

6. The device according to claim 1, wherein respective ones of the aggregated-event-reporting data-items include the flow and event-type information of the respective event-reporting data-items.

7. The device according to claim 1, wherein the aggregation circuitry is configured to compute a respective signature of the flow information of respective ones of the aggregated-event-reporting data-items, wherein respective ones of the aggregated-event-reporting data-items include the respective computed signature and respective event-type information.

8. The device according to claim 7, wherein the aggregation circuitry is configured to forward the respective computed signature and the flow information of a respective one of the aggregated-event-reporting data-items to the collector node responsively to the respective signature being computed an initial time from the flow information.

9. The device according to claim 1, wherein respective ones of the aggregated-event-reporting data-items include a cumulative event-count and a cumulative byte-count of the respective event-reporting data-items.

10. The device according to claim 1, wherein the aggregation circuitry is configured to compute a measure of event burstiness of the events aggregated in each of the aggregated-event-reporting data-items each time the data of another one of the event-reporting data-items is aggregated into a respective one of the aggregated-event-reporting data-items.

11. The device according to claim 10, wherein the aggregation circuitry is configured to compute the measure of event burstiness of the events as a harmonic average.

12. The device according to claim 10, wherein the measure of event burstiness of the events for one of the aggregated-event-reporting data-items includes, for each respective one of a plurality of time-difference ranges, a count of adjacent events having a time difference within the respective time-difference range.

13. The device according to claim 1, further comprising an event reporting filter to prevent some of the event-reporting data-items from being input to the aggregation circuitry.

14. An event reporting method, comprising:
transmitting packets belonging to multiple flows to a packet data network;
generating event-reporting data-items, each including flow and event-type information about a packet-related event occurring in a network device;
aggregating, in the network device, data of at least some of the event-reporting data-items into aggregated-event-reporting data-items aggregated according to the flow and event-type information of the at least some event-reporting data-items;
storing the aggregated-event-reporting data-items in a memory; and
forwarding one aggregated-event-reporting data-item of the aggregated-event-reporting data-items to a collector node, and purging the one aggregated-event-reporting data-item from the memory.

15. The method according to claim 14, wherein the forwarding and the purging is performed responsively to the memory reaching a threshold for storage of the aggregated-event-reporting data-items.

16. The method according to claim 14, further comprising assigning the one aggregated-event-reporting data-item to an event-reporting queue queuing at least one of the aggregated-event reporting data-items waiting to be forwarded to the collector node.

17. The method according to claim 14, further comprising assigning the aggregated-event-reporting data-items to different event-reporting queues, each queuing at least one of the aggregated-event reporting data-items waiting to be forwarded to the collector node.

18. The method according to claim 14, further comprising assigning respective ones of the aggregated-event-reporting data-items to different priority event-reporting queues according to a respective count of events in the respective aggregated-event-reporting data-items.

19. The method according to claim 14, wherein respective ones of the aggregated-event-reporting data-items include the flow and event-type information of the respective event-reporting data-items.

20. The method according to claim 14, further comprising computing a respective signature of the flow information of respective ones of the aggregated-event-reporting data-items, wherein respective ones of the aggregated-event-reporting data-items include the respective computed signature and respective event-type information.

21. The method according to claim 20, further comprising forwarding the respective computed signature and the flow information of a respective one of the aggregated-event-reporting data-items to the collector node responsively to the respective signature being computed an initial time from the flow information.

22. The method according to claim 14, wherein respective ones of the aggregated-event-reporting data-items include a cumulative event-count and a cumulative byte-count of the respective event-reporting data-items.

23. The method according to claim 14, further comprising computing a measure of event burstiness of the events aggregated in each of the aggregated-event-reporting data-items each time the data of another one of the event-reporting data-items is aggregated into a respective one of the aggregated-event-reporting data-items.

24. The method according to claim 23, wherein the computing includes computing the measure of event burstiness of the events as a harmonic average.

25. The method according to claim 23, wherein the measure of event burstiness of the events for one of the aggregated-event-reporting data-items includes, for each respective one of a plurality of time-difference ranges, a count of adjacent events having a time difference within the respective time-difference range.

26. The method according to claim 14, further comprising preventing some of the event-reporting data-items from being input to the aggregating step.

27. A software product, comprising a non-transient computer-readable medium in which program instructions are stored, which instructions, when read by a central processing unit (CPU), cause the CPU to:
transmit packets belonging to multiple flows to a packet data network;
generate event-reporting data-items, each including flow and event-type information about a packet-related event occurring in a network device;
aggregate, in the network device, data of at least some of the event-reporting data-items into aggregated-event-reporting data-items aggregated according to the flow and event-type information of the at least some event-reporting data-items;
store the aggregated-event-reporting data-items in a memory; and forward one aggregated-event-reporting data-item of the aggregated-event-reporting data-items to a collector node, and purging the one aggregated-event-reporting data-item from the memory.

\* \* \* \* \*

UNITED STATES PATENT AND TRADEMARK OFFICE
CERTIFICATE OF CORRECTION

PATENT NO. : 10,924,374 B2  
APPLICATION NO. : 16/515060  
DATED : February 16, 2021  
INVENTOR(S) : Aviv Kfir et al.

Page 1 of 1

It is certified that error appears in the above-identified patent and that said Letters Patent is hereby corrected as shown below:

On the Title Page

Item (72), should read as follows:
Aviv Kfir, Nili (IL); Barak Gafni, Campbell, CA(US); Zachy Haramaty, Hemed (IL); Gil Levy, Hod Hasharon (IL); Liron Mula, Ramat Gan (IL); Jacob Ruthstein, Mazor (IL); Michael Tahar, Yavne (IL)

Signed and Sealed this  
Tenth Day of October, 2023

Katherine Kelly Vidal  
*Director of the United States Patent and Trademark Office*